No. 651,541. Patented June 12, 1900.
G. C. WRIGHT.
FASTENING DEVICE FOR GLASS PLATES.
(Application filed Feb. 21, 1900.)
(No Model.)
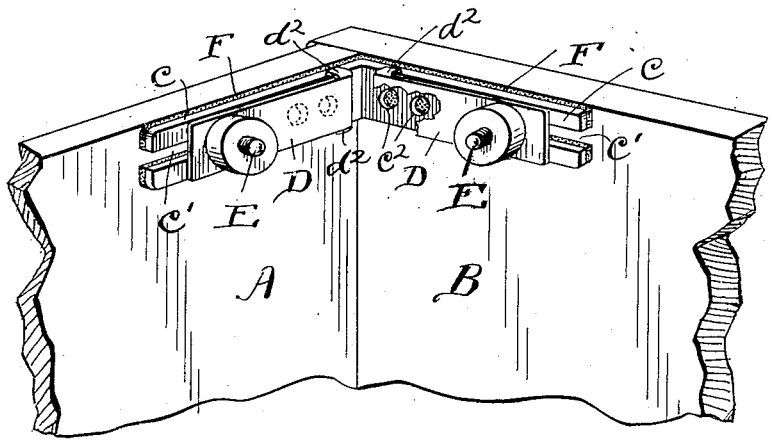
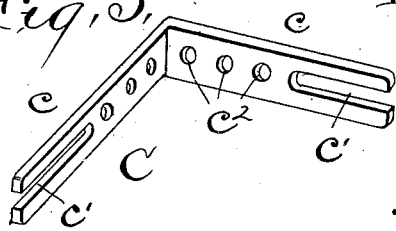
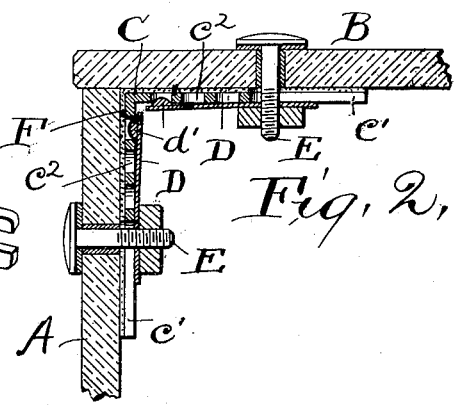
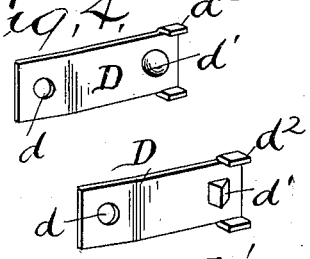
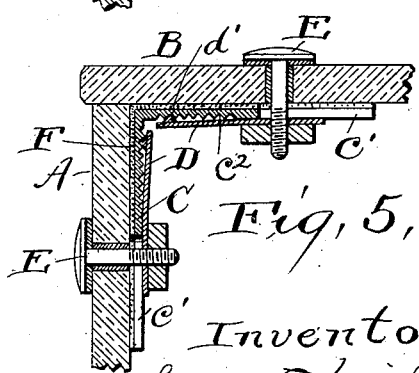
Witnesses
E. R. Gilchrist
H. M. Wise.
Inventor
George C. Wright,
By his Attorneys,
Thurston & Bates.

UNITED STATES PATENT OFFICE.

GEORGE C. WRIGHT, OF CLEVELAND, OHIO, ASSIGNOR TO THE VAN CLEVE GLASS COMPANY, OF SAME PLACE.

FASTENING DEVICE FOR GLASS PLATES.

SPECIFICATION forming part of Letters Patent No. 651,541, dated June 12, 1900.

Application filed February 21, 1900. Serial No. 6,013. (No model.)

*To all whom it may concern:*

Be it known that I, GEORGE C. WRIGHT, a citizen of the United States, residing at Cleveland, in the county of Cuyahoga and State of Ohio, have invented a certain new and useful Improvement in Fastening Devices for Glass Plates, of which the following is a full, clear, and exact description, reference being had to the accompanying drawings.

The fastening device shown embodying my invention is especially adapted for fastening together plates of glass of which the so-called "all-glass" show-windows and show-cases are made. It is desirable that these glass plates be securely held in proper relations to one another under normal conditions, and it is also desirable that if the supports for said glass plates shall settle unevenly said plates shall be permitted to move relatively to one another, because otherwise the strain upon the plates due to the settling of said supports frequently causes one or both of the plates to break.

My invention is especially adapted to connect the plates and to permit them to move automatically relative to one another under the circumstances above referred to.

The invention consists in the construction and combination of parts hereinafter described, and pointed out definitely in the claims.

In the drawings, Figure 1 is a perspective view of my improved fastening device in use as the means for fastening together two glass plates, which are also shown. Fig. 2 is a sectional plan view of the same. Fig. 3 is a perspective view of the angle-plate forming a part of my device. Fig. 4 is a perspective view of one of the spring-plates, which also forms a part of my fastening device. Fig. 5 is a sectional plan view of a modified form of the fastening device in use to fasten together two glass plates, and Fig. 6 is a perspective view of one of the spring-plates employed in this form of the device.

Referring to the parts by letters, A and B represent the two glass plates which are to be fastened together. The edge of one plate is ground to fit against the side of the other plate near its edge when the plates are in the desired angular relation to one another.

C represents a metal angle-plate, the two arms $c\ c$ of which are in such angular relation to one another that said plate will fit the interior angle between said glass plates. In each arm of this angle-plate is a longitudinal slot $c'$, which slot extends from the outer end of the arm inward a sufficient distance. Between the inner ends of this slot and the angle of said plate are a plurality of depressions $c^2$. Associated with each arm of this angle-plate is a spring-plate D, having near its outer end a hole $d$, through which the bolt E passes. This bolt also passes through the slot $c'$ in the angle-plate and through a hole in the associated glass plate. The spring-plate D has near its inner and free end a projection $d'$ from that face which lies against the angle-plate, and this projection is beveled and is adapted to enter any one of the depressions in said angle-plate. The spring-plate is provided at its free end also with bent-over fingers $d^2$, which engage with the upper and lower edges of the angle-plate, and thereby guide the spring-plate and hold it in proper relation to said angle-plate.

When this fastening device is employed to fasten two glass plates together, the said plates are placed in proper relation to each other. The angle-plate, which preferably is provided with a felt backing F, is placed against the two plates, fitting the interior angle which they make, and the bolts E are passed through the holes in the glass, through the slots in the angle-plate, and through the holes in the spring-plates, and then the nuts are tightened up. The projections on the spring-plate enter the depressions in the angle-plate, and thereby the angle-plates are under normal conditions held in fixed relationship to the angle-plate. If, however, the supports for the glass plates settle unevenly, there will be a tendency for the two glass plates to move relative to one another, and this movement is permitted because when said plates move the spring-plates move with them, and these spring-plates slip upon the arms of the angle-plate until the projections enter other depressions therein. This of course opens up joint between the two glass plates. This opening, however, will be soon discovered and the supports for the plates can be again trued up. In the meantime there has been no breakage of the expensive glass plates.

In the form of the device shown in Figs. 1 to 4, inclusive, the depressions in the arms of the angle-plate are in the form of round holes, and the projections on the spring-plates are formed by pressing the metal down to form substantial hemispherical projections on the under side. In the modified form of the device shown in Figs. 5 and 6 the outer faces of the two arms $c\ c$ of the angle-plate C are serrated, whereby the so-called "depressions" are numerous and of angular formation. The projection on the under side of each spring-plate is V-shaped to fit any one of these serrations.

Having described my invention, I claim—

1. In a fastening device for glass plates, the combination of an angle-plate adapted to fit the interior angle formed by said glass plates, each arm of said angle-plate having a longitudinal slot, with two plates movable upon the inner faces of the arms of said angle-plate, and having bolt-holes, and bolts which pass through said holes and slots and through holes in the glass plates, substantially as described.

2. In a fastening device for glass plates, the combination of an angle-plate adapted to fit the interior angle formed by said glass plates, each arm of which angle-plate has a longitudinal slot, with two spring-plates which lie against the inner faces of the arms of said angle-plate, each spring-plate having a hole, and bolts passing through said holes and slots and through holes in the glass plates, the angle-plate and the spring-plates having, respectively, on their proximate faces, projections and depressions for engagement with each other, substantially as specified.

3. In a fastening device for glass plates, the combination of an angle-plate adapted to fit the interior angle formed by said glass plates, each arm of said angle-plate being longitudinally slotted from its outer end and being provided with a longitudinal row of depressions, with two spring-plates, each having near its outer end a bolt-hole, and having near its inner end horizontal fingers for engagement with the edges of the angle-plate, and having also near its inner end a beveled projection adapted for engagement with the depressions in said angle-plate, and bolts passing through said bolt-holes and slots and through holes in the glass plates, substantially as and for the purpose specified.

In testimony whereof I hereunto affix my signature in the presence of two witnesses.

GEORGE C. WRIGHT.

Witnesses:
 ALBERT H. BATES,
 E. L. THURSTON.